United States Patent [19]

Merrill et al.

[11] 4,018,939

[45] Apr. 19, 1977

[54] METHOD OF RENDERING SURFACES NONFOGGING

[75] Inventors: Richard E. Merrill, Wakefield; Arthur A. Massucco, Natick, both of Mass.

[73] Assignee: Arthur D. Little, Inc., Cambridge, Mass.

[22] Filed: May 15, 1975

[21] Appl. No.: 577,701

Related U.S. Application Data

[63] Continuation-in-part of Ser. No. 309,332, Nov. 24, 1972, Pat. No. 3,935,367.

[52] U.S. Cl. .............................. 427/54; 427/163; 427/165
[51] Int. Cl.$^2$ .......................................... B05D 3/06
[58] Field of Search ............ 427/44, 54, 162, 163, 427/165

[56] References Cited

UNITED STATES PATENTS

| | | |
|---|---|---|
| 3,257,476 | 6/1966 | Tobolsky ........................... 260/859 |
| 3,291,859 | 12/1966 | Tobolsky ........................... 260/859 |
| 3,635,756 | 1/1972 | Shepherd et al. .................. 427/44 |
| 3,705,808 | 12/1972 | Kasugai et al. .................... 427/44 |
| 3,745,042 | 7/1973 | Lim et al. .......................... 427/44 |
| 3,935,367 | 1/1976 | Merrill et al. ..................... 427/165 |

*Primary Examiner*—John H. Newsome
*Attorney, Agent, or Firm*—Schiller & Pandiscio

[57] ABSTRACT

A method for improving adhesion of nonfogging film coatings comprising a block copolymer containing alternating blocks of polyurethane and a hydrophilic polyacrylic, to a polymeric substrate by subjecting the substrate to a controlled exposure to UV irradiation. Exposure may be prior to or following casting the nonfogging coating in place on the substrate. By varying the weight ratio of polyurethane/polyacrylic it is possible to vary the flexibility of the coating and hence to widen the range of substrates to which the coating may be applied, e.g., from flexible wrapping material to rigid mirrors.

18 Claims, No Drawings

METHOD OF RENDERING SURFACES NONFOGGING

This is a continuation-in-part of application Ser. No. 309,332 filed Nov. 24, 1972, now U.S. Pat. No. 3,935,367.

This invention relates generally to nonfogging coatings and in particular to a method of applying nonfogging coatings to polymeric substrates.

As is well known, windows, lenses, mirrors, eyeglasses, flexible transparent wrappings and the like may become badly fogged in the presence of moisture, creating inconvenience and in some instances, a dangerous condition. It has thus been proposed to apply to the surface of such windows, etc. a transparent coating which has the ability to render the surfaces nonfogging, while maintaining the desired surface characteristics such a smoothness and gloss, and resistance to abrasion, scratching and solvents.

Certain transparent nonfogging coatings are disclosed in U.S. Pat. Nos. 3,488,215; 3,515,579; 3,520,949; and 3,635,756. These patented nonfogging coatings are described as comprising hydrophilic acrylate or methacrylate polymers which may be modified by copolymerization with a monobasic or polybasic unsaturated carboxylic acid or partial ester of the acid. The polymer may be crosslinked with a polyepoxide.

While such patented coatings are found to render the surfaces to which they are applied nonfogging, these coatings are somewhat brittle when not plasticized with absorbed or adsorbed moisture (i.e., when not serving as a nonfogging surface); also they may undergo a momentary fogging when first exposed to moisture before attaining a nonfogged state.

In our copending application Ser. No. 309,332 filed Nov. 24, 1972, now U.S. Pat. No. 3,935,367 we disclose forming a nonfogging coating on selected substrates by casting a film of a block copolymer of polyurethane and polyacrylic blocks on the substrate. The urethane-acrylic block polymers described as suitable in the practice of our aforesaid application are those formed by the methods taught by Tobolsky in U.S. Pat. Nos. 3,251,746, 3,291,859, and 3,865,898. While coatings comprising block polymers formed in the manner described by Tobolsky are found to adhere strongly to many substrates such as glass and metal, and in the case of certain metal substrates may provide a desired degree of flexibility (when required) and good nonfogging characteristics, adhesion of these coatings to certain polymeric substrates such as polycarbonates, methacrylates, polyvinyl chloride, ethylene-vinyl acetate and polyethylene occasionally is not as strong as would be desired. However, such polymeric substrates may be preferred to glass when weight is a factor and/or when shatter resistance is required.

It is therefore a primary object of the present invention to provide an improved method for treating polymeric substrates to render them nonfogging. It is another object of the present invention to provide such a method in which the polymeric substrate is a polycarbonate, methacrylate, polyvinylchloride, ethylene-vinyl acetate or polyethylene, and wherein a strongly adhering nonfogging coating is formed on the substrate, which coating has a controllable flexibility, which does not undergo a preliminary fogging, which is transparent and which exhibits resistance to abrasion, scratching, solvent cleaners and washing with water. A more specific object is to provide a method of improving adhering of nonfogging coatings of the type described by Tobolsky in U.S. Pat. Nos. 3,257,746, 3,291,859 and 3,865,898 to polymeric substrates of the characted described herein.

The invention accordingly comprises the several steps and the relation of one or more of such steps with respect to each of the others, which are exemplified in the following detailed disclosure, and the scope of the invention will be indicated in the claims.

In the practice of this invention, surfaces of polymeric materials such as polycarbonate, polymethyl methacrylate, polyvinyl chloride, ethylene-vinyl acetate and polyethylene are made nonfogging by depositing a thin transparent film of a selected block copolymer on the surface to be rendered nonfogging. The block copolymer is characterized as being alternately polyurethanes and polyacrylics. Adhesion of the block copolymer film to the polymeric surface is enhanced by treating the polymeric surface with controlled exposure to irradiation in the ultraviolet spectrum. In one embodiment of the invention the substrate to be rendered nonfogging is exposed to UV irradiation prior to depositing the film onto the substrate. In another embodiment of the invention, the substrate is exposed to UV irradiation following casting the film onto the substrate.

Urethane-acrylic block polymers suitable for the practice of this invention include those formed by the methods taught by Tobolsky in U.S. Pat. Nos. 3,257,476 and 3,291,859. In accordance with the teachings of Tobolsky, these block copolymers are prepared by reacting a prepolymer (typically a polyether or polyester) with an isocyanate or a diisocyanate; the isocyanate-terminated prepolymer which results in turn in reacted with a dual-functional free radial initiator such as a hydroperoxide or dihydroperoxide; and the polymeric peroxycarbamate which results is then used to polymerize a vinyl monomer to form the desired block copolymer. Polymerization is said to be carried out in solution. Tobolsky also reports that the polymeric peroxycarbamate can be isolated, and the polymerization can then be carried out as bulk or suspension polymerization.

Also suitable for the practice of this invention are those copolymers formed using in aliphatic diisocyanate and a dihydroperoxide in the synthesis of the polymeric peroxycarbamate as taught by Tobolsky in U.S. Pat. No. 3,865,898. This latter method gives rise to block copolymers which are transparent and which have a very low or negligible vinyl homopolymer content. (See also "Synthesis and Characterization of Some New Polymeric Peroxycarbamates" by B. M. Baysal, W. T. Short and A. V. Tobolsky in *Journal of Polymer Science:* Part A-1, Vol. 10, 909–919(1972). This latter method using the aliphatic diisocyanate and dihydroperoxide is preferred for forming the block copolymers used in the practice of this invention.

We have found that where block copolymers formed in the manner described by Tobolsky are applied as nonfogging coatings to polymeric surfaces such as polycarbonates, methacrylates, polyvinyl chloride, ethylene-vinyl acetate and polyethylene, adhesion between the coating and the polymeric substrate surface may be enchanced by irradiating the polymeric surface to be rendered nonfogging with a controlled exposure to ultraviolet light. The coating is applied as a solution of the block copolymer using known coating techniques, and the coating is dried to form a film of the block copolymer in accordance with the teachings of our aforesaid application Ser. No. 309,332. Irradiation may be prior to or following casting the coating in place onto the polymeric surface. The resulting nonfogging coatings do not undergo a preliminary fogging prior to becoming nonfogging, and they can be formed to remain flexible in the absence of any moisture by using suitable hydrophilic acrylic monomers and isocyanate terminated prepolymers as taught by Iobolsky.

Monomers which are suitable for polymerization as one block of the block copolymers are the polymerizable diene and vinyl monomers which form hydrophilic polyacrylics. Among such monomers are hydroxyalkyl acrylates such as 2-hydroxyethyl acrylate, 2-hydroxypropyl acrylate and 3-hydroxypropyl acrylate, hydroxyalkyl methacrylates such as 2-hydroxyethyl methacrylate, 2-hydroxypropyl methacrylate and 3-hydroxypropyl methacrylate, diethylene glycol monoacrylate, dipropylene glycol monomethacrylate, diethylene glycol monomethacrylate and the like. Acrylamide, methylol acrylamide, methacrylamide and methylol methacrylamide may also be used as monomers in forming the block copolymers.

Commercially available hydroxyalkyl acrylates and methacrylates typically may contain a small amount of the corresponding diacrylate or dimethacrylic by-products. However, these materials may contribute to hardness and resistance of the coating to abrasion, scratching, and to attack by solvents, and may also serve as cross-linking agents. On the other hand not over about 2 percent by weight of these by-products is generally desirable.

A small amount (e.g., up to about 10% by monomer weight) of an ethylenically unsaturated acid may also be present in the monomer polymerized by the polymeric polyperoxycarbamate. Among such ethylenically unsaturated acids are acrylic, cinnamic, crotonic, methacrylic, itaconic, aconitic, maleic, fumaric, transfumaric, mesaconic and citraconic acids. Partial esters of these acids may also be added in minor quantities. Exemplary of such partial esters are mono-2-hydroxypropyl itaconate, mono-2-hydroxyethyl citraconate, mono-2-hydroxypropyl aconitate, monoethyl itaconate and the like.

The prepolymer used in forming the polymeric peroxycarbamate must be one which forms a polyurethane block which is not soluble in or degradable by moisture. In other words, the polyurethane block must remain stable when subjected to moisture such as water and aqueous base cleaning solvents such as ammonia. The polyurethane block may be capable of absorbing or adsorbing some moisture, a property which is believed to contribute to the nonfogging property of the block copolymer. Generally, polyethers of relatively high molecular weights (for example, 2000 and above) are preferred as the prepolymer component. However, polyesters which give rise to polyurethane blocks meeting the aforesaid requirement of water and solvent resistance may also be used. Exemplary of polyethers which are preferred are polyethylene glycols having molecular weights ranging from about 1000 to 4000 and sold by Union Carbide Corporation under the registered trademark "Carbowax". Exemplary of polyesters are those of adipic acid, such as ethylenepropylene adipate and butylene adipate.

The polyurethane content of the block copolymer may vary in the range of from about 10 to about 40 weight percent of the block copolymer. The polyurethane blocks impart flexibility to the block copolymers. Thus, increased flexibility may be attained by increasing polyurethane content. However, since the polyurethane component generally is more susceptible to degradation by water and solvents over extended periods of time, the amount of polyurethane in the block copolymer should be a balance of these two factors. For example, if the nonfogging coating is to be applied to transparent wrapping material for low temperature food storage, (e.g. polyethylene film) flexibility is more important than long-time resistance to water, solvents, abrasion and scratching, and about 20–40 weight percent of polyurethane may be incorporated into the block copolymer to attain the desired flexibility. On the other hand, if the nonfogging coating is to be applied to a rigid substrate surface such as a bathroom mirror, flexibility is of little importance, while resistance to water, cleansing agents, solvents, abrasion and scratching are the major considerations. For use under such conditions, the polyurethane content of the block copolymers may be only about 10–20 weight percent.

The polyurethane content of the block copolymer may be controlled by the molecular weight of the prepolymer (e.g., polyether), the nature of the other reactants, the reaction conditions, and by the addition of suitable chain extenders such as butanediol. Such chain extenders are used in known manner to adjust the chain length of the polymeric peroxycarbamate to obtain a block copolymer having a desired quantity of polyurethane blocks.

Especially preferred for forming the nonfogging coating in accordance with the instant invention are block polymers resulting from the use of 4.4'-dicyclohexyl diisocyanate to form an isocyanate-capped prepolymer, in conjunction with the use of a dihydroperoxide, (preferably 2, 5-dimethyl-2, 5-bis (hydroperoxy) hexane), to form the intermediate peroxycarbamate, in accordance with the teachings of Tobolsky U.S. Pat. No. 3,865,898. According to Tobolsky, the use of these specific materials gives rise to a colorless, block copolymer in relatively large thickness when the prepolymer and vinyl polymer components are chosen to have essentially the same index of refraction. Also, by controlling reaction conditions and component ratios, Tobolsky reports it is possible to vary and control physical properties of the block copolymers, e.g. impact strength and modulus and to minimize homopolymer content.

If desired, the block copolymer may also be cross-linked which provides the finished nonfogging coating with additional impact strength, and resistance to abrasion and wear, and cleansing agents. Crosslinking is accomplished (when desired) by adding any well known crosslinking agent (which does not detract from transparency or other desired physical property of the coating) to the block polymer before applying the coating to the substrate. Typically, the crosslinkage agent is added in an amount up to about 20% by weight of the block polymer. Among suitable cross-linking agents are mentioned ethylene glycol dimethacrylate, divinyl benzene and divinyl toluene.

Still another modification involves mixing a minor amount (i.e. less than about 10% by block copolymer weight) of a polyepoxide with the block copolymer. Exemplary of suitable polyepoxides are cycloaliphatic diepoxides such as vinyl cyclohexane dioxide, 3,4-epoxycyclohexylmethyl-3', 4'-epoxycyclohexane carboxylate, butadiene diepoxide and bisphenol A-epichlorohydrin.

An important and critical feature of the present invention is to strongly adhere a film of the aforesaid block copolymers to selected polymeric substrate surfaces. We have found that adhesion of such block copolymers films to polymeric surfaces will be enhanced by irradiating the polymeric surface to be rendered nonfogging with a controlled exposure to irradiation in the ultraviolet spectrum. Irradiation may be prior to or following casting the block copolymer film in place onto the polymeric substrate. Exposure of the substrate surface in the ultraviolet spectrum is believed to modify the polymeric substrate surface, e.g. as by oxidation by ozone formation or the generation of free radicals, and, in the case where the block copolymer coating is cast onto the polymeric surface before the irradiation, the UV irradiation is believed to initiate crosslinking in the coating. Exposure time appears to be dependant primarily on the intensity of the ultra-violet irradiation applied to the polymeric substrate surface. The latter is dependent on the power of the source of irradiation and its distance from the surface being treated. Of course, the irradiation should be limited in time and/or intensity to avoid physically damaging the substrate surface and/or coating as by burning or warping. On the other hand, change of wave length of the irradiation appears to have little effect on adhesion strength, as long as irradiation is in the ultraviolet spectrum. Also, the particular substrate material, the choice of block copolymer coating to be applied, and coating thickness, appear to have little importance.

Generally, little improvement in coating adhesion results if the flux of UV light incident on the surface to be treated is less than about 20 watts per square inch. Above the aforesaid threshold adhesion of the coating to the polymer surface is found to improve with increased exposure to the UV irradiation. On the other hand, little additional improvement in coating adhesion results from exposure of greater than about 400 watts per square inch. Also, in the case where the polymeric surface is treated with UV irradiation prior to the time the block copolymer coating is cast onto the surface, in order to achieve maximum improvement in adhesion, the coating should be applied to the surface within at most about 24–48 hours following irradiation. Thus, for example, if a 200 watt lamp in a quartz envelope (Hanovia 4 inch lamp) is used at the UV irradiation source, and is spaced 10 inches from the polymeric substrate surface to be coated, treating typically should be for a time in the range of from about 3 to 15 minutes to obtain strong adhering of any of the subsequently applied copolymer films. Conversely, if the irradiation source is spaced about 5 inches from the surface to be treated, exposure time is reduced to about 2 minutes to 10 minutes. Other irradiation sources require different spacing and time values.

The block copolymer film coating typically is applied to the substrate surface as a dispersion of the selected block copolymer in a solvent carrier. Suitable solvents include, but are not limited to, blends of ethylene glycol monomethyl ether and methylethyl ketone, ethyl alcohol, dimethyl formamide, methyl alcohol, blends of the ethylene glycol monomethyl ether with acetone and the like. Final coating film thicknesses should range between about 0.10 to 3 mils dry thickness while from 0.3–1.0 mils is preferred. The final coating film thickness desired will determine the solids concentration of the solution of dispersions used. Generally, concentration of from about 5 to 20% by weight will be satisfactory.

The coating dispersion may be applied by an suitable technique known in the art for casting films such as by dipping, spraying, painting, knife-coating or by printing. Subsequent to application of the coating dispersion, the solvent is removed by heating to leave a transparent film tightly adhered to the substrate. Full adhesion strength between substrate and film coating appears to result following the irradiation once the coating is substantially dried. If desired, and in cases where the substrate can withstand exposure to moderate baking temperatures the coated substrate may then be baked to harden the coating. Typically baking (when desired) will be at a temperature in the range of from about 70° to 130° C. for from about 4 to 16 hours.

The coated polymeric substrates resulting may be used as vehicle windows such as those in automobiles, buses, aeroplanes and the like, as optical lenses in eyeglasses, photographic equipment and binoculars; as mirrors; and as transparent packaging films.

The following examples, which are illustrative and not meant to be limiting, are given to provide an additional description of the invention. In order to compare the effect of the UV irradiation in the following examples, untreated samples as controls were also tested in each case.

EXAMPLE I

Into a flask equipped with an agitator and heated by means of a controlled temperature oil bath was charged 500 grams of a polyethylene glycol (molecular weight range of 3000 to 4000). The flask was placed under a nitrogen atmosphere and the contents were heated to 90° C until sufficient melting has taken place to permit stirring. After one half hour 29 grams of toluene, 93.7 grams of 4,4'; -dicyclohexyl diisocyanates and 0.48 ml. of stannous dilaurate were added. The contents were stirred under a nitrogen atmosphere at 70° C. After 4 hours at 70° C, 17.4 grams of dry 2, 5-dimethyl -2, 5-di (hydroperoxy) hexane, 2.6 ml of dibutyl tin dilaurate and 87 grams of toluene were added. The solution was heated and stirred under nitrogen at 50° C until all of the 2, 5-dimethyl -2, 5-dihydroperoxy hexane was dissolved. Then 8.2 grams of 1, 4-butane diol and 104 grams of toluene were added. Heating at 50° C was continued for a period of 4 hours to form a solution of polymeric peroxycarbamate.

Ninety-six grams of the polymeric peroxycarbamate solution (50 grams on a dry solids basis) was charged in a flask equipped with a stirrer and heated in an oil bath. To this were added 180 grams of hydroxyethyl methacrylate, 18 grams of acrylic acid, and 950 grams of methyl cellosolve. The reaction was carried out under $CO_2$ for 4 hours at 85° C. The reaction was terminated and a block copolymer product was precipitated in water, filtered, and dried under vacuum at 40° C. A 90% yield was obtained and the block copolymer was approximately 20% weight concentration of urethane and 80% weight concentration of acrylic segments.

The copolymer was dissolved at 20% by weight concentration in a 70/30 blend of methyl ethyl ketone and ethyl alcohol. A clean, clear polycarbonate sheet (0.125 inches thick) was cut into two sample pieces. One sample piece was exposed to a 200 watt lamp (4 inch long) (Hanovia Model No. 7420 ultraviolet light source) at a distance of 10 inches. Exposure was for 5 minutes. The other sample piece received no UV exposure as control. Each piece was then coated on one side with the polymer solution, and the coatings were air dried at room temperature for 4 hours to form a dry film 0.3 mil thick. (In the case of the UV treated sample, the coating was applied within about 30 minutes following the UV exposure.)

The resulting film coatings were found to be light transmitting and optically clear, and neither was found to fog upon exposure to hot, moist air.

Adhesion strength of the film coatings to the polycarbonate sample sheets was tested as follows: A series of parallel cuts were made through the film coatings in one direction, and second series of cuts were made at right angles to the first, about ⅛ inch apart. A piece of clear, pressure-sensitive adhesive tape was then pressed down over the squares cut in each sample sheet and the tapes were then rapidly pulled away from the samples at right angles to the plane of the samples. For the UV treated polycarbonate coated sheet, no squares of film coating were observed to be lifted from the polycarbonate sheet; however, for the sample sheet receiving no UV treating prior to coating, all squares of coating were found to be easily lifted from the substrate.

EXAMPLE II

The purpose of this Example is to see if addition of a cross linking agent to the copolymer effects adhesion strength of the block copolymer film coating to a polymer substrate. The procedure of Example I is repeated with the following change:

Twenty grams of the block copolymer of Example I was dissolved in 80 grams of a 70/30 blend of methylethyl ketone and ethyl alcohol. To this solution were added 0.20 gram of tetraethylene glycol diacrylate as a cross linking agent and 0.36 gram of t-butyl perocotate as a catalyst. The resulting solution was applied to clean polycarbonate sample sheets (0.125 inches) at 4 mils wet thickness and the solution then air dried at room temperature for 4 hours. The resulting film coatings were found to be optically clear, and neither were found to fog when exposed to hot moist air. The coated sheets were tested as in Example I. For the UV treated polycarbonate coated sheet, no squares of film coating were observed to be lifted by the tape; however, adhesion of the film coating to the untreated substrate was found to be poor and all of the film squares were found to be lifted by the tape.

EXAMPLE III

The purpose of this Example is to see if post-baking affects adhesion strength of the block copolymer film coating to a polymer substrate. The procedure of Example II is repeated with the following change: The coated substrates after drying were heated in a circulating air oven at 130° C for 16 hours to cure the coatings. The resulting film coatings were found to be optically clear and resistant to fogging when exposed to hot moist air as in Example II. However, the coatings were found to be harder and more resistant to abrasion and scratching than the coatings formed in Example II, but receiving no post-baking. On the other hand, adhesion strength of the film coatings to the samples were found to be unchanged, i.e., only in the case of the UV pretreated substrate did the coating adhere strongly.

EXAMPLE VI

Into a flask equipped as described in Example I were added 500 grams of the polyethylene glycol, 93.7 grams of 4,4'-dicyclohexyl diisocyanate 0.5 ram of dibutyl tin dilaurate and 292 grams of toluene. The reaction was carried out under nitrogen for 3 hours at 70° C. At this point, 16.3 grams of 2, 5-diethylethyl-2, 5-bis (hydroperoxy) hexane, 7.9 grams of butanediol, 2.66 grams of dibutyl tin dilaurate, and 189 grams of toluene were added and a reaction continued at 50° C for a period of 4 hours to form a solution of polymeric peroxy-carbamate.

Into a flask equipped with stirrer and heated in an oil bath were charged 71 grams of the polymeric peroxycarbamate solution prepared (40 grams of the poly(peroxycarbamate) on a dry solids basis), 144 grams of 2-hydroxyethyl methacrylate, 16.0 grams of acrylic acid, and 800 grams of ethylene glycol monomethyl ether. The reaction was carried out under $CO_2$ for 6 hours at 85° C, terminated, and the block copolymer resulting was precipitated in water, filtered, and dried under vacuum as in Example I. The product block copolymer had a weight ratio of polyurethane/polyacrylic of about 20/80.

The product was dissolved at a concentration of 20% by weight in a 75/25 blend of ethylene glycol monomethyl ether and methylethyl ketone, applied to clean polycarbonate 0.125 inches thick film samples (one of which was exposed to UV light as in Example I) and air dried for 4 hours at room temperature. The resulting coatings were light transmitting, optically clear, and did not fog under exposure to hot, moist air. However, only for the sample polycarbonate substrate first treated with UV light was the coating found to be strongly adhered.

EXAMPLE V

The purpose of the Example is to see if changing the concentration of polyurethane present in the block copolymer will effect any properties of the resulting coating film.

A flask similar to that used in Example I was charged with 500 grams of polyethylene glycol (molecular weight range of 3000 to 3700), 93.7 grams of 4.4'-dicyclohexyl diisocyanate 0.5 gram of dibutyl tin diaurate and 292 grams of toluene. The reaction was carried out under nitrogen for 3 hours at 70° C. At this point, 8.1 grams of 2,5-dimethylethyl -2,5-bis (hydroperoxy) hexane, 12 grams of butanediol as a chain extender, 2.66 grams of butyl tin dilaurate, and 189 grams of toluene were added to the flask contents and the reaction continued for 4 hours at 50° C.

Into a flask equipped with a stirrer and heated in an oil bath was charged 142 grams of the above reaction solution (80 grams of poly(peroxycarbamate) on a dry solids basis), 108 grams of 2-hydroxethyl methacrylate, 12 grams of acrylic acid, and 800 grams of ethylene glycol monoethylether. The reaction was carried out under $CO_2$ for 6 hours at 85° C, terminated and the resulting block compolymer product was precipitated in water, filtered, and dried under vacuum as in Example IV.

The product block copolymer, which has a polyurethane-polyacrylic weight ratio of 40/60, was dissolved at 20% concentration by weight in a 75/25 blend of ethylene glycol monomethyl ether and methylethyl ketone, applied as a thin coating to clean polycarbonate film samples (one of which was exposed to UV light as in Example I) after being air dried at room temperature for 4 hours. The resulting coatings were light transmitting and optically clear and did not fog upon exposure to hot moisture. The cotaing on the UV light treated substrate adhered strongly to the substrate; however, the coating on the substrate sample not exposed to UV light prior to application of the coating showed no adhesion at all. The coatings of this example were softer and much more flexible than those of Example IV.

EXAMPLE VI 500 grams of poly(butylene adipate), (mw. approximately 3000, hydroxy terminated), 131 grams of 4,4'-dicyclohexyl diisocyanate, 300 grams of toluene and 0.5 gram of dibutyl tin dilaurate were reacted for 3 hours at 80° C under nitrogen. Then 23.5 grams of 2,5-dimethylethyl-2,5-bis-(hydroperoxy) hexane, 11.2 grams of butanediol, 2.7 grams of dibutyl tin dilaurate and 190 grams of toluene were added. This solution was heated and stirred under nitrogen at 50° C for a period of 4 hours to form a solution of polymeric peroxycarbamate.

The block copolymer was prepared by reacting 20 grams of the polymeric peroxycarbamate prepared, 162 grams of 2-hydroxyethyl methacrylate, and 18 grams of acrylic acid in 800 grams of ethylene glycol monomethyl either under $CO_2$ for 6 hours at 85° C. The reaction was terminated and the block copolymer resulting was precipitated in water, filtered, and dried under vacuum at 45° C. A 90% yield was obtained. The block copolymer was approximately 10% weight concentration of urethane and 90% weight concentration of acrylic segments.

The polymer was dissolved at 20% by weight concentration in a 75/25 blend of ethylene glycol monomethyl ether and methylethyl ketone. The solution was applied to clean polycarbonate film samples (one of which was exposed to UV light as in Example I), air dried, and then cured in a circulating air oven at 130° for 16 hours. The resulting film coatings were light transmitting and optically clear, and did not fog upon exposure to hot, moist air. Adhesion of the film coating to the UV treated substrate was excellent; however, adhesion of the coating to the substrate sample receiving no UV exposure prior to casting of the coating thereon, was relatively poor.

EXAMPLE VII

The purpose of this example is to show how strength of adhesion of the coating to the substrate varies with intensity of the UV exposure.

The procedure of Example I is repeated with the following changes: The UV irradiation source was a QZ Processor Model No. 1202AN available from Radiation Polymer Company. The UV unit is equipped with a variable speed belt transport system and two mercury lamps capable of operating independently on high and low energy output. The unit is set for maximum energy output (200 watts/square inch) and the transport system is adjusted to provide various exposure times as follows:

| Belt Speed (ft/min) | Exposure Time (Recorded) |
| --- | --- |
| 100 | 0.05 |
| 50 | 0.10 |
| 40 | 0.12 |
| 20 | 0.25 |
| 10 | 0.50 |

The coating was cast on the UV exposed substrate samples, with coating thickness and drying conditions as in Example I. Results: Coating adhesion to substrates treated for less than about 0.12 seconds was not substantially improved over substrates receiving no UV exposure. Conversely, after 0.25 seconds, excellent adhesion of the coating was obtained, and did not appear to further increase with increased exposure time.

EXAMPLE VIII

The purpose of this example is to see if adhesion of the aforesaid block copolymers to other polymeric substrates could also be improved by pretreating the polymeric substrate with exposure to UV light. Polymethyl methacrylate plate (0.125 inches, polyethylene film (5mil), polyvinyl chloride film (5mil) and ethylene-vinyl acetate film (5 mil) were selected as the substrates. The block copolymer coating solution was prepared as in Example I. Samples of each polymeric substrate material were cut in half, and one half was subjected to exposure to UV light (Hanovia source) under the conditions described in Example I. All samples were then coated and the coating dried as before. Results: By comparing samples of coated substrates, one sees that only those samples treated by exposure to UV light before the coating was cast have strongly adhered coatings.

EXAMPLE IX

The purpose of this example is to see how adhesion of coating to substrate is effected in the UV treated substrate is allowed to stand after exposure to the UV light for a time before the coating is cast. Samples of polycarbonate film (0.125 inches) were exposed to UV light under the conditions described in Example I. The samples were then allowed to stand for the following times after exposure prior to casting block copolymer coatings thereon.

| TIME | |
| --- | --- |
| 5 | minutes |
| 30 | minutes |
| 1 | hour |
| 12 | hours |
| 24 | hours |
| 24 | hours |
| 48 | hours |

One sample was given no exposure to UV light as control. Coatings and drying conditions were as described in Example I.

Results: After 48 hours delay following UV exposure before coating is cast, little improvement in coating adhesion is seen to result from the UV exposure.

EXAMPLE X

The purpose of this example is to show how adhesion of the block copolymer coatings can also be enhanced when the nonfogging coating is cast in place prior to the UV treatment. The procedure of Example II was repeated with the following changes: 0.04% by weight of benzoin methyl ether was added to the coating formulation as a photo initiator and to promote crosslinking. The resulting coating formulation was applied to two samples of polycarbonate sheet (0.125 inches) at 4.0 mil wet thickness, the coating was allowed to dry at room temperature, and one of the coated substrate samples was irradiated with UV light as in Example I.

Results: By comparing substrate samples, one sees that the film coating on the sample treated with UV light adhered strongly to the polycarbonate substrate, while the coating on the sample receiving no UV treatment could be peeled cleanly from the polycarbonate film surface. Also, in the case of the sample treated with UV light, the coating was found to have enhanced hardness and resistance to abrasion was scratching as compared to the sample receiving no UV treatment.

EXAMPLE XI

Example X was repeated with the following changes: The polymeric substrate chosen was 1 mil polyethylene film (corona treated). The coating formulation comprised the same 20/80 urethane-acrylic block copolymer prepared in Example I, but dissolved at 20% by weight concentration total solids in methyl cellosolve. To this solution was added 5.5 ml. of tetraethylene - glycol diacrylate, and 0.12 grams of phenanthrene quinone as a photo initiator to promote crosslinking. The coating formulation was applied to two samples of the polyethylene film at 4.0 mil wet thickness and allowed to dry at room temperature. One sample was exposed to a 100 watt General Electric Model RS Sunlamp at a distance of 10 inches. Exposure was for 30 minutes. The other sample received no UV exposure as control.

The resulting film coating were found to be light transmitting and optically clear, and neither was found to fog upon exposure to hot moist air.

Adhesion strength of the film coatings to the polyethylene films were tested as in Example I. For the UV treated sample, no squares of film coating were observed to be lifted from the polyethylene film; however, for the sample receiving no UV treatment, the coating was found to peel cleanly from the polyethylene film surface. The film coating on the UV treated sample was also found to have enhanced hardness and resistance to abrasion and scratching as compared to the sample receiving no UV treatment.

EXAMPLE XII

The procedure of Example XI was repeated with the following changes: The phenanthrenequinone in the coating formulation was replaced by 0.12 grams of benzoin methyl ether as a photo initiator and to promote crosslinking. The substrate was coated, the coating air dried, and the coated substrate was exposed to UV irradiation as in Example XI. Coating adhesion was found to be as in Example XI, that is, only in the case of the UV treated sample did the coating adhere strongly to the substrate. Coating hardness and resistance to abrasion and scratching are also found to be as in Example XI.

EXAMPLE XIII

The procedure of Example XI was repeated with the following changes: the polymer substrates chosen for this example were ethylene-vinyl acetate film (1 mil) and polymethyl methacrylate plate (0.125 inches). The coating was cast, air dried, and the resulting coated substrates were irradiated with UV light as in Example XI. The irradiated samples were tested and the coating was found to be securely adhered in each case. On the other hand, the coatings on control samples similarly coated but not exposed to UV irradiation, were easily peeled from the substrates.

EXAMPLE XIV

The procedure of Example XI was repeated with the following changes: Coating formulation was modified by replacing the phenanthrene quinone by an equal quantity of benzoin methyl ether as UV initiator. The polymeric substrate chosen was polycarbonate sheet (0.125 inches). The polymeric substrate samples were coated, and the coating dried as in Example XI. After drying one of the coated samples was exposed to UV light under a Model 654A-10 Hanovia UV lamp (200 watts) at a distance of 12 inches for 10 minutes. A second coated substrate sample received no UV exposure as control. Excellent coating adhesion was obtained for the UV treated sample, whereas in the case of the control sample which received no UV exposure, the coating was easily peeled from the polycarbonate substrate surface.

EXAMPLE XV

The procedure of Example XIV was repeated with the following changes: The polymeric substrate chosen for this example was rigid polyvinyl chloride film (5 mil). The sample was coated and the coating dried as in Example XIV. However, exposure to UV irradiation was reduced to 5 minutes.

Results — Excellent coating adhesion was obtained for the sample receiving UV exposure. On the other hand, coating adhesion to the unexposed sample was poor.

EXAMPLE XVI

The purpose of this example is to show how strength of adhesion of a coating to the substrate, which coating was cast in place prior to the UV treatment, also varies with intensity of the UV exposure.

The procedure of Example X is repeated with the following changes: The UV irradiation source was a QZ Processor Model No. 1202AN available from Radiation Polymer Company. The UV unit is equipped with a variable speed belt transport system and two mercury lamps capable of operating independently on high and low energy output. The unit is set for maximum energy output (200 watts/square inch) and the transport system is adjusted to provide various exposure times as follows:

| Belt Speed (ft/min) | Exposure Time (Recorded) |
|---|---|
| 100 | 0.05 |
| 50 | 0.10 |
| 40 | 0.12 |
| 20 | 0.25 |
| 10 | 0.50 |

The coating was cast on the UV exposed substrate samples, with coating thickness and drying conditions as in Example X. Results: Coating adhesion to substrates treated for less than about 0.12 seconds was not substantially improved over substrates receiving no UV exposure. Conversely, after 0.25 seconds, excellent adhesion of the coating was obtained, and did not appear to further increase with increased exposure time.

Since certain changes may be made in carrying out the above method and in the article set forth without departing from the scope of the invention, it is intended that all matter contained in the above description shall be interpreted as illustrative and not in a limiting sense.

We claim:

1. A method for improving adhesion of urethane-acrylic block copolymer nonfogging film coatings to polymeric substrate surfaces, comprising the step of subjecting said substrate to exposure to UV light in an amount of at least about 20 watts per square inch.

2. A method as claimed in claim 1 wherein said substrate is exposed to said UV light prior to depositing said film coating thereon, and including the steps of casting a solution of said urethane-acrylic block copolymer onto the resulting UV exposed surface, and drying said cast solution to form a strongly adhering nonfogging film coating on said surface.

3. A method as claimed in claim 1 wherein said film coating is cast onto said substrate surface from solution prior to said exposure to UV light, and including the step of drying said cast solution to form a film coating on said surface.

4. A process as claimed in claim 1 wherein said block copolymer comprises alternating blocks of polyurethanes and vinyl polymers.

5. A process as claimed in claim 4 including the steps of
   a. reacting a prepolymer with a diisocyanate to form an isocanate terminated prepolymer;
   b. reacting the isocyanate terminated prepolymer resulting in step (a) with a dual functional free radical initiator to form a peroxycarbamate,
   c. adding the peroxycarbamate resulting in step (b) to a vinyl monomer in a liquid medium, and
   d. heating the mixture from step (c) for a time sufficient to polymerize said monomer and form said block copolymer.

6. A process according to claim 5 wherein said isocyanate-terminated prepolymer is formed by reacting a diisocyanate with a hydroxyl-terminated polyether or polyester prepolymer.

7. A process according to claim 5 wherein said diisocyanate comprises 4,4'-dicyclohexyl diisocyanate, and said dual functional free radical initiator comprises 2, 5 - dimethyl -2, 5-bis (hydroperoxy) hexane.

8. A process according to claim 5 wherein said vinyl monomer comprises a hydrophilic acrylic monomer selected from the group consisting of hydroxyalkyl acrylates, hydroxyalkyl methacrylates, monoacrylates, monomethacrylates, acrylamides and methacrylamides.

9. A process according to claim 5 including the step of adjusting the relative ratios of the peroxycarbamate and vinyl monomer so as to result in a block copolymer having a polyurethane content in the range of from about 10 to 40 percent by weight.

10. A process according to claim 7 wherein said polyurethane content is adjusted to the range of from about 10–20 weight percent.

11. A process according to claim 7 wherein the polyurethane content is adjusted to the range of from about 20–40 weight percent.

12. A process according to claim 1 wherein said block co-polymer solution is cast onto said exposed surfaces within about 24 hours following said exposure.

13. A process according to claim 1 wherein said polymeric surface comprises a polycarbonate.

14. A process according to claim 1 wherein said polymeric surface comprises a polymethyl methacrylate.

15. A process according to claim 1 wherein said polymeric surface comprises polyvinylchloride.

16. A process according to claim 1 wherein said polymeric surface comprises polyethylene.

17. A process according to claim 1 wherein said polymeric surface comprises poly(ethylene-vinyl acetate).

18. A process according to claim 1 including the step of baking said coating at a temperature in the range of from about 70° to 130° F for from about 4 to 16 hours to promote crosslinking to harden the coating.

* * * * *